United States Patent [19]

McCormack

[11] Patent Number: 4,533,834

[45] Date of Patent: Aug. 6, 1985

[54] OPTICAL FIRE DETECTION SYSTEM RESPONSIVE TO SPECTRAL CONTENT AND FLICKER FREQUENCY

[75] Inventor: Ray G. McCormack, St. Joseph, Ill.

[73] Assignee: The United States of America as represented by the Secretary of the Army, Washington, D.C.

[21] Appl. No.: 446,143

[22] Filed: Dec. 2, 1982

[51] Int. Cl.³ .............................................. H05R 33/00
[52] U.S. Cl. .................................... 250/554; 250/227; 340/578
[58] Field of Search ............... 250/554, 227, 372, 342, 250/236, 226; 356/300, 330, 308, 309, 326, 328; 340/815.31, 600, 578, 630

[56] References Cited

U.S. PATENT DOCUMENTS

| 3,100,264 | 8/1963 | Jaffe et al. | 356/330 |
|---|---|---|---|
| 3,374,950 | 3/1968 | Menzel et al. | 250/227 |
| 3,742,474 | 6/1973 | Muller | 340/578 |
| 3,829,218 | 8/1974 | Alyanak | 356/300 |
| 3,885,879 | 5/1975 | Louder et al. | 250/227 |
| 3,936,648 | 2/1976 | Cormault et al. | 250/554 |
| 4,037,113 | 7/1977 | Moore | 250/554 |
| 4,156,816 | 5/1979 | Lindgren | 250/574 |
| 4,164,373 | 8/1979 | Schuss et al. | 356/316 |
| 4,175,865 | 11/1979 | Horvath et al. | 356/338 |
| 4,212,516 | 7/1980 | Sawamura | 250/227 |
| 4,370,557 | 1/1983 | Axmark et al. | 250/554 |

FOREIGN PATENT DOCUMENTS 54-149497  11/1979  Japan .................................. 250/227

OTHER PUBLICATIONS

Linford, R. M. F., Dillow, C. F., and Trumble, T. M., "Optical Emissions from Burning Jet Fuel" *Journal of Aircraft*, vol. 14, No. 4, 5/1977.
Hill, Richard, "Ultraviolet and Near Infrared Spectral Analysis of a Burner-Can Burn-Through Flame," *FAA Report No. FAA-RD-73-154*, 3/1972.
Custer, L. P., and Bright, R. G., "Fire Detection: State of the Art," 6/1974, *National Bureau of Standards Report No. NASA CR-134842*.

Primary Examiner—David C. Nelms
Assistant Examiner—J. Gatto
Attorney, Agent, or Firm—Darrell E. Hollis

[57] ABSTRACT

A fire detection system using optical fibers to transmit flame signals from a plurality of remote monitoring stations to a central detection and analysis station, the invention comprises a network of optical fibers which connect the monitoring stations to the central detection station for the purpose of transmitting incident analog optical, infrared and ultraviolet spectra to the central station for detection of fire conditions. The central detection and analysis station preferably includes a rotary scanner which scans each of the optical fibers, light from the fibers being dispersed by a prism associated with the scanner to allow detection of the various spectral components of the dispersed light by light sensitive semiconductors. The detected spectral components are then compared to known fire signal signatures which include flicker rate and spectral content information.

9 Claims, 4 Drawing Figures

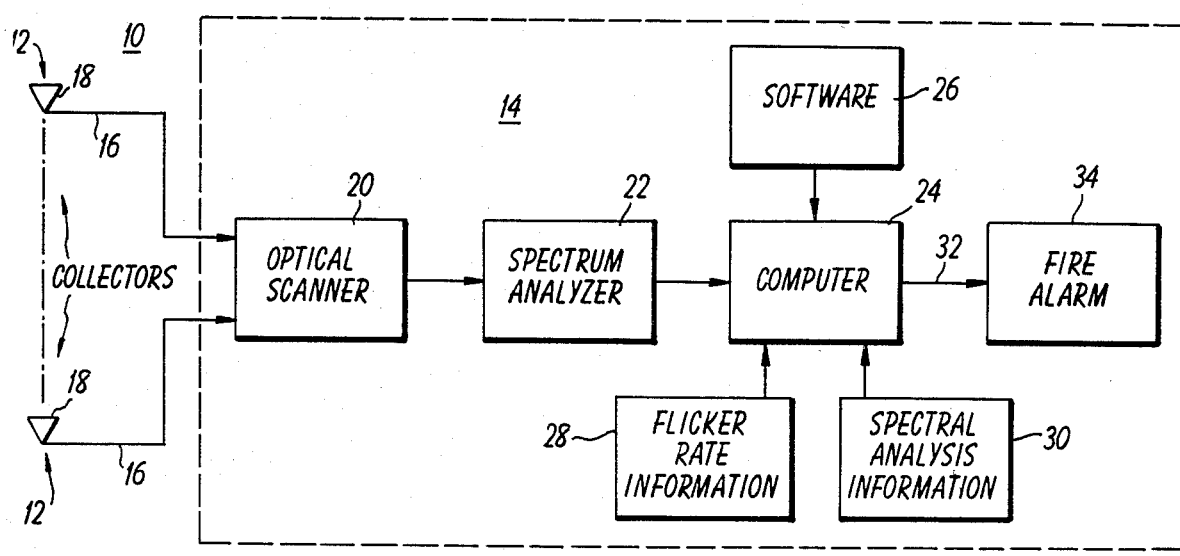
FIG. 1
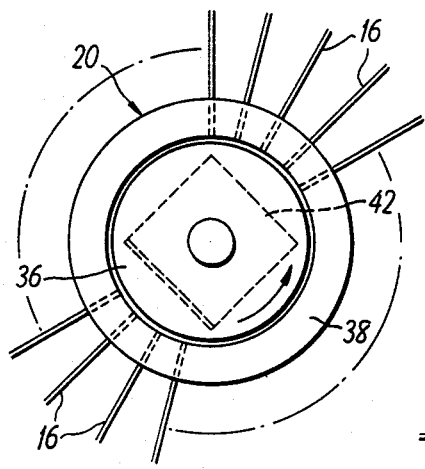
FIG. 2
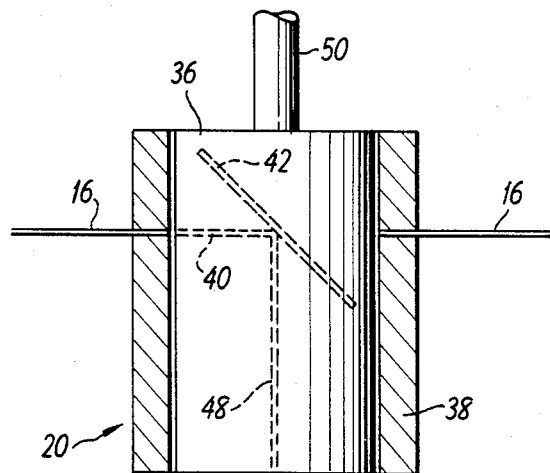
FIG. 3
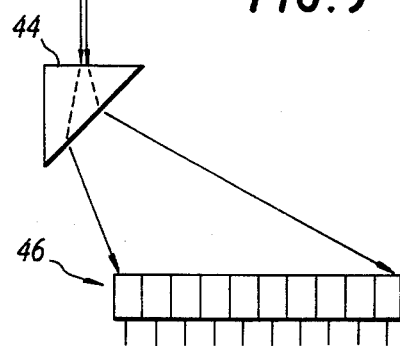

OPTICAL FIRE DETECTION SYSTEM RESPONSIVE TO SPECTRAL CONTENT AND FLICKER FREQUENCY

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates generally to fire detection systems having remote stations coupled to a central analysis station and particularly to a fire detection system having optical fibers which transmit flame signals from remote sensing stations to a central detection and analysis station.

2. Description of the Prior Art

Conventional fire detection and alarm systems take a variety of forms, those systems utilizing a number of monitors scattered throughout a facility which is to be protected being of particular interest relative to the present improvement. In such systems, each of the remote monitors effectively constitutes a flame detector and contains either an ionization chamber or light sensitive cell in association with optical subsystems, each monitor acting to produce an electrical output which is transmitted as an electrical signal by appropriate wire or cable connections to a central analysis subsystem within which the electrical signals are analyzed and a warning signal generated when analysis shows the detection of a fire by one of the monitors. These conventional fire detection systems accordingly require the use of a transistor at each monitoring location in addition to associated optics and mounting hardware along with ancillary electrical components for conversion of a light signal to an electrical signal at the remove monitoring location. Additionally, metal conduits are required to encase the wire or cable along which electrial signals are transmitted from each monitor to the central analysis subsystem, this shielding being necessary in order to prevent EMI/RFI interference, a primary consideration due to the fact that output from the transducers are of low magnitude. Shielding of the wire or cable connectors as well as the flame detection apparatus at each monitor is necessary in order to prevent damage caused by fire extinguishing fluids which can cause corrosion and other damage which result in false signals and contribute to defective flame detection operation. Substantial expense is thus involved in shielding and sealing the relatively long wiring runs and in sealing each monitor in order to prevent contact between these elements of the system and fire extinguishing fluids. Substantial expense is also incurred in these prior art systems by virtue of the fact that each of the remote monitors actually constitutes a flame detector in and of itself and thus requires that a transducer and associated apparatus constitute each monitor.

Exemplary of issued United States patents which relate to optical systems for spectral analysis of incident electromagnetic radiation, such as can be used in the detection of fires, are patents such as U.S. Pat. No. 4,037,113 to Moore which discloses the detection of flames in a boiler by the disposition of bundles of fiber optics in openings formed in the boiler, the optical fibers feeding incident light to respective photodetectors. Louder et al, in U.S. Pat. No. 3,885,879, discloses a spectrophotometer which utilizes an adjustable spectral wedge interposed between a light source and a photosensitive apparatus for selecting wavelengths of light which are to be transmitted to a sample for analysis of the sample, optical fibers being used to transmit the selected wavelengths of light. Horvath et al, in U.S. Pat. No. 4,175,865, discloses a smoke detector which utilizes a plurality of optical fibers for detecting scattered smoke. In the Horvath et al patent, all optics are located within a single smoke detecting monitor. In U.S. Pat. No. 4,164,373, Schuss et al discloses an apparatus which utilizes optical fibers of differing length to provide a range of optical time delays for incident chromatic light pulses for the selective spatial and frequency analysis of light with a single detector.

It is to be noted that none of the patents noted above discloses the concept of utilizing optical fibers in a fire detection system to transmit a flame signal from a plurality of different locations to a single detector. The conventional fire detection systems described above also fail to envision the concept of utilizing optical fibers in a fire detection system to transmit a flame signal from a plurality of different locations to a single detector. The conventional fire detection systems, in contradistinction, utilize a plurality of detectors disposed at various monitoring locations, the detectors each being connected by electrically conductive wires to a central electronic analyzer, such systems having attendant expense and operational problems as described above. The present invention differs at a minimum from the conventional systems in the utilization of optical fibers to transmit a flame signal, thereby eliminating problems with EMI/RFI interferance which occur in the prior systems by virtue of the transmission of electrical signals of low magnitude. The further invention further obviates difficulties encountered by the penetration of fire extinguishing fluids into detectors at the remote monitoring locations as well as shorting caused by such contact in the electrical transmission portion of conventional systems.

SUMMARY OF THE INVENTION

The invention provides a fire detection system which utilizes a plurality of optical fibers to transmit a flame signal from a plurality of monitoring locations to a central detector and an analysis subsystem. The present fire detection system particularly comprises a number of remote monitoring stations which include electromagnetic energy concentrating optical subsystems which collect and concentrate energy from the infrared through the ultraviolet portion of the spectrum which is incident on the monitoring stations. The energy concentrated by the collectors of each monitoring station is then transmitted through at least one optical fiber for each monitoring station to the central detection and analysis station. Accordingly, a network of optical fibers acts to connect the plurality of remote monitoring stations to the central detection station, the central detection station detecting light energy from each of the optical fibers and comparing spectral components and light characteristics to known fire signal signatures in order to generate an alarm in the event of sufficient correlation between the detected light signal and known fire signal signatures.

The central detection and analysis station preferably comprises a rotating scanner, a prism and a plurality of light-sensitive semiconductors. The scanner is utilized to scan each of the optical fibers entering the central detection and analysis station from the plurality of remote monitoring stations. Light from each of the optical fibers thus scanned is directed to the prism for dispersion into spectral components which are respectively detected by an array of the light sensitive semiconductors. The outputs of these semiconductors are transmitted to associated correlation apparatus for comparison of the detected light signals with known standards in order to determine whether a fire is present at any one of the remote monitoring stations.

Utilization of optical fibers to connect remote monitoring stations to a central detection and analysis station is central to the present concept. The present network of optical fibers connecting the monitoring stations to a central station allows the use of but a single detector at the central station rather than the requirement for individual detectors at each remote monitoring station as is necessary in the prior art. Further, the network of optical fibers connecting the remote monitoring stations to the central station allows transmisson of an information-bearing light signal from the remote stations to the central station rather than the transmission of an electrical signal which is subject to interference and shorting. Overall system cost is substantially reduced through practice of the present invention by virtue of the elimination of expensive transducer and associated detection apparatus at each of the remote monitoring stations and the elimination of shielding and sealing structure for each monitoring station and for electrical transmission wiring between remote monitoring stations and a central subsystem.

In a typical facility which is to be protected by systems such as is herein described, a large number of remote monitoring stations including optical collectors are required in order to assure coverage of an entire area which is to be protected. In a typical facility such as a large aircraft hangar, a number of collectors and associated optical fiber transmission links are necessary in order to "see" fires which may be initiated underneath objects such as aircraft wings and the like. Both overhead and wall-mounted collectors forming the remote monitoring stations are required. The network of optical fibers which transmit collected light from the remote monitoring stations to the central detection and analysis station act to eliminate EMI/RFI interference problems and potential corrosion problems which are encountered with electrical wiring and conventional fire detection systems. The present system thus eliminates false alarms which are known to occur due to interference problems occurring due to low magnitude electrical signals and also corrosion and shorting problems which occur due to contact between fire extinguishing fluids and electrically conductive wiring connecting remote detectors to a central subsystem.

The central detection and analysis station of the present invention can take a variety of forms and includes apparatus capable of analyzing the transmission of each optical fiber from each of the remote monitoring stations. Analysis of each optical fiber can be accomplished by a variety of acceptable methods, including the use of individual filters, the use of light-sensitive semiconductors for each collector/fiber link or the sequential scanning of the output of each optical fiber. Appropriate optics, such as would include a prism operating with a rotary scanner, allows spectral analysis to be conducted on the received light energy from each collector/optical fiber link, this spectral analysis being performed in conjunction with measurements of flicker rates and similar information to provide improved system reliability and a reduction in the rate of false alarms.

Accordingly, it is the primary object of the present invention to provide a fire detection system comprised of a plurality of remote monitoring stations connected to a central detection and analysis station by means of a network of optical fibers, the remote monitoring stations including apparatus capable of collecting incident light and then concentrating the light for transmission through the optical fibers.

Another object of the present invention is to provide a fire detection system comprised of a plurality of remote monitoring stations joined to a central detection and analysis station by means of a network of optical fibers, light signals transmitted to the central detection and analysis station being detected and analyzed at the central station for comparison with known fire signal signatures to determine whether fire conditions exist at one or more of the remote monitoring stations.

A further object of the invention is to provide a fire detection system which utilizes optical fibers to transmit light signals from a plurality of remote monitoring stations to a central detection and analysis station, the central detection and analysis station including a rotary scanner for scanning each of the optical fibers, light from the fibers being dispersed by a prism associated with the scanner and wherein the various spectral components of the dispersed light are then detected by light-sensitive semiconductors with the detected light being compared to known fire signal signatures which preferably include flicker rate and spectral content information for correlation to determine whether a fire is at one or more of the remote monitoring stations.

Further objects and advantages of the present invention will become more readily apparent in light of the following detailed description of the preferred embodiments.

BRIEF DESCRIPTION OF THE DRAWINGS

FIG. 1 is a diagrammatical view illustrating a fire detection system according to the present invention wherein light collectors at a plurality of remote monitoring stations are connected to a central detection and analysis station;

FIG. 2 is a schematic view illustrating a rotary scanner capable of forming a portion of a central detection and analysis station, the rotary scanner being seen from above in order to illustrate connection of optical fibers with the rotary scanner;

FIG. 3 is a schematic view illustrating in elevation a portion of a central detection and analysis station wherein a plurality of optical fibers are scanned and recieved light is further processed and detected in order to provide information which can be compared with known fire signatures; and, FIG. 4 is a diagrammatical view illustrating operation of the computing portion of the central detection and analysis station.

DESCRIPTION OF THE PREFERRED EMBODIMENTS

Figure 4:
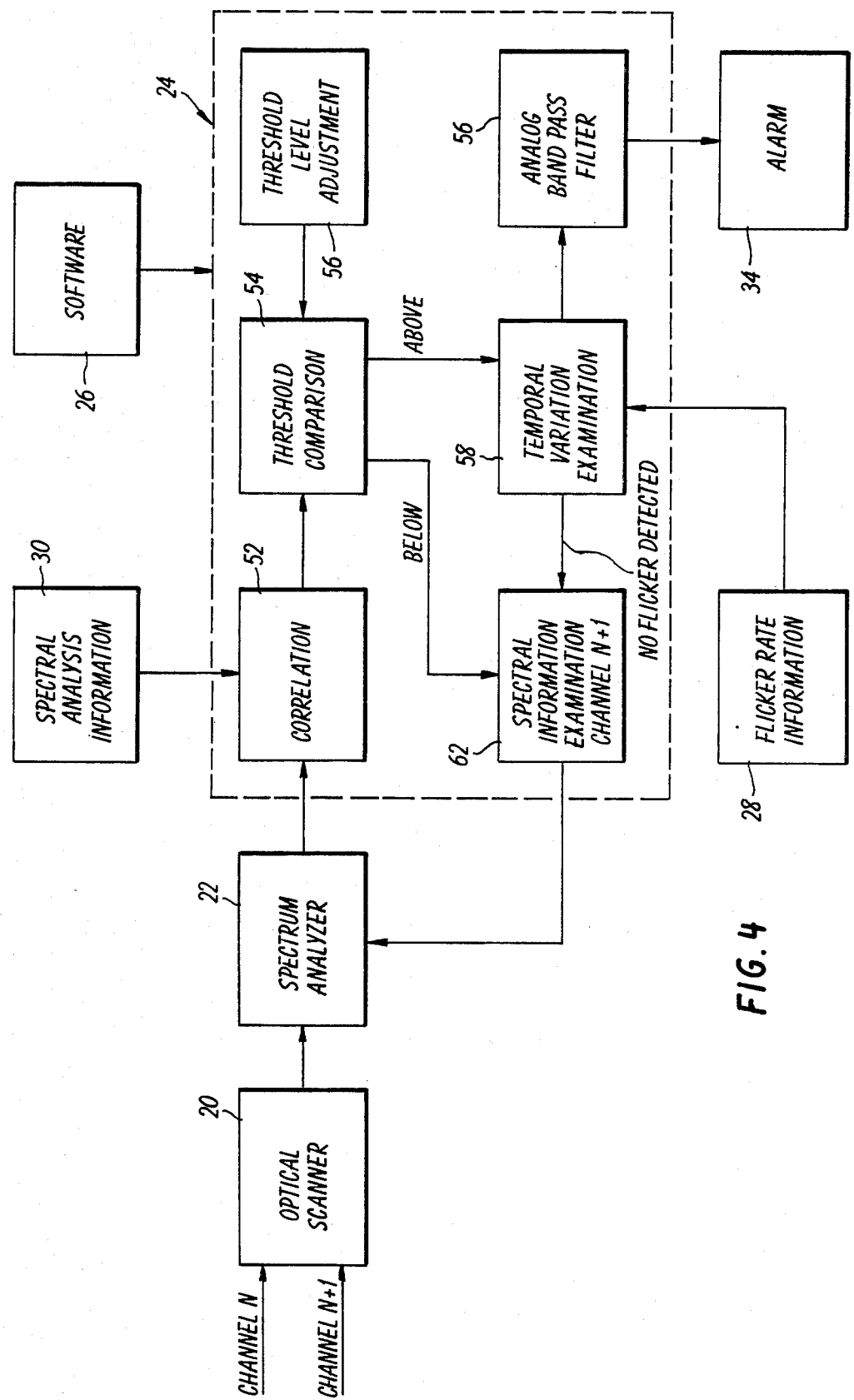

Referring now to the drawings and particularly to FIG. 1, a fire detection system is shown diagrammatically at 10 to be comprised of a plurality of remote monitoring stations shown generally at 12 and which are operatively connected to a central detection and analysis station shown at 14 by means of a plurality of optical fibers 16. The number of remote monitoring stations 12 which are necessary for protection of a given facility varies depending upon both the size of the facility and the nature of the structure as well as the nature of equipment and materials which are contained within the structure. In a typical facility such as an aircraft hangar, a large number of remote stations 12 would be required to provide coverage of an entire area with the ability to "observe" fire conditions which could begin underneath objects such as aircraft wings and the like. In such situations, both overhead and wall-mounted stations are required.

The remote monitoring stations 12 essentially each constitute an optical collector 18 which receives incident electromagnetic radiation at least in the infrared through ultraviolet spectrum and concentrates the energy to produce a light signal which is then transmitted to the central detection and analysis station 14 by at least one optical fiber 16 joining the given remote station 12 to the central station 14. The optical collectors 18 may themselves comprise bundles of fiber optics coupled with collecting and focusing lenses (not shown) as are common in the art. It is to be understood that a variety of optical apparatus exist which is capable of performing the collection function of the optical collectors 18 and the invention does not encompass any particular structure for the collectors 18.

Each remote monitoring station 12 is effectively connected to the central detection and analysis station 14 by means of at least one of the optical fibers 16. The optical collector 18 within each remote station 12 is coupled to at least one of the optical fibers 16, the electromagnetic energy received by and concentrated within the optical collector 18 entering the particular optical fiber 16 associated with a given station 12, the concentrated electromagnetic energy simply being directed into the end of the optical fiber 16 such that the energy travels through the fiber 16 along its length in a known manner to reach the central station 14. Focusing of the concentrated electromagnetic energy onto the optical fiber 16 is understood to be a well known process which is easily performed by simple optical means.

Since the remote monitoring stations 12 need only be comprised of one of the optical collectors 18, it is not necessary to actually detect light or generate an electrical signal dependent upon detected light at the remote monitoring stations 12 as is necessary in conventional fire detection systems. Accordingly, the remote stations 12 are substantially simplified in structure and are substantially lower in cost. Further, the requirement for sealing of the remote stations 12 is eliminated due to the reduced need to protect fragile electronics from fire extinguishing fluids. The optical fibers 16, by virtue of transmitting a light signal rather than an electrical signal of low magnitude, need not be shielded since the light signals transmitted are not subject to EMI/RFI interference as are electrical signals transmitted over electrically conductive wiring.

The central detection and analysis station 14 is generally considered to comprise all of the structure shown in FIG. 1 other than the remote monitoring stations 12 and the optical fibers 16. In other words, the central station 14 comprises that structure which exists in an essentially central location at the opposite end of the optical fiber 16 from the remote monitoring stations 12. It is to be understood that certain functions which will be described herein as occuring at the central station 14 can be performed at a location remote from the station 14, particularly those functions which occur after generation of signals such as electrical signals which are analogous to the light signals received at the central station 14.

Each optical fiber 16 entering the central station 14 bears information contained in the light signal carried by fiber 16 (or carried in the absence of light from a given fiber 16). Each optical fiber 16 entering the central station 14 could be coupled to a light-sensitive semiconductor through a filter or similar optics (not shown). However, a preferred method and apparatus for analysis of the light signals received through the optical fibers 16 comprise an optical scanner represented at 20 and described in greater detail in FIGS. 2 and 3, the optical scanner 20 particularly comprising a rotary scanner which sequentially scans the ends of the optical fibers and directs the received light signals to a spectrum analyzer represented at 22, the spectrum analyzer 22 being shown and described in greater detail relative to FIGS. 2 and 3. In general, the spectrum analyzer 22 separates the scanned light signals into various spectral components which are then directed on to light-sensitive semiconductors to produce electrical output representative of spectral density and which thus contain information which can be compared to known fire signatures by correlation techniques to determine whether fire conditions exist at any one of the remote monitoring stations 12.

As seen in FIG. 1, the electrical signals from the spectrum analyzer 22 are conventionally fed to a computer 24 which, through the use of appropriate software 26 such as is conventionally generated, analyzes the electrical signals from the spectrum analyzer 22 and compares the electrical signal with flicker rate information and spectral analysis information available to the computer and schematically represented at 28 and 30 to produce an output signal 32 which actuates a fire alarm 34 in the event that the electrical signals from the spectrum analyzer 22 correlate with the flicker rate information 28 and spectral analysis information 30 of a known fire signature. It is to be understood that the techniques and apparatus used to analyze the electrical signals emanating from the spectrum analyzer 22 can take the form of conventional analysis subsystems such as conventionally used in fire detection systems described above as prior art. In these prior fire detection systems, incident light at a remote monitoring station is converted to an electrical signal at the remote station itself and then transmitted to a central site for analysis. In the present fire detection system 10, collected light is not converted to electrical signals at the remote stations 12 but is converted at the central station 14 after being transmitted from the stations 12 to the station 14 by means of optical fibers 16. Those analysis subsystems of the central station 14 which receive electrical signals from the spectrum analyzer 22 need not be physically disposed at the same location as are the optical scanner 20 and spectrum analyzer 22, it being a simple matter to transmit the electrical signals from the spectrum analyzer 22 to a separate location for the analysis conducted by the computer 24.

Referring now to FIGS. 2 and 3, particular structure which is represented by the optical scanner 20 and spectrum analyzer 22 of FIG. 1 is shown. The optical scanner 20 acts to sequentially couple the outputs of the plurality of optical fibers 16 to light-sensitive detection structure. The optical scanner 20, as represented by the rotary scanner 36, samples all outputs from the plurality of optical fibers 16, the ends of which are supported by a stationary annular mounting block 38 within which the rotary scanner 36 rotates. The ends of each of the optical fibers 16 extend through the block 38 and communicate with the internal cylindrical cavity of the block 38 such that at least one light guide 40 comes into alignment with the end of each of the optical fibers 16 on each rotation of the rotary scanner 36, the light guide 40 directing optical energy signals received from the optical fibers 16 to a diagonally mounted mirror 42 which is carried by and rotates with rotary scanner 36. The mirror 42 redirects the received light signals to a fixed prism 44 forming a part of the spectrum analyzer 22, the prism 44 specturally dispersing the received light signal and directing the various spectral components of the light signal to light-sensitive semiconductors 46 which produce electrical outputs representative of the spectral density functions of the spectral components of the light signals. The electrical outputs are then processed and analyzed as is described above.

By providing a sufficiently high sampling rate dependent upon rotation of the rotary scanner 36, essentially all of the spectral information contained within the light outputs of the optical fibers 16 can be reconstructed. Disposition of the optical fibers 16 at even spacings regularly around the substantially cylindrical mounting block 38 allows regular sampling of the optical fibers 16 by the rotating light guide 40. The light guide 40 can be comprized of a light pipe or similar light conductive structure and can communicate with a perpendicularly mounted light guide section 48 which extends longitudinally of the rotary scanner 36 with one end located at the mirror 42 and the other end located adjacent to the prism 44, thereby providing a light path for the light reflected from the mirror 42. The substantially cylindrical rotary scanner 36 is mounted to and rotated by a shaft 50 which preferably connects to the rotary scanner 36 at the end thereof opposite the prism 44.

The light-sensitive semiconductors 46, which may comprise diodes or similar structure, each have electrical outputs which are dependent upon the energy content of the spectral portion illuminating each semiconductor. Therefore, the semiconductor array, which can vary in the number of semiconductors employed, will produce electrical output pulses having pulse rates determined by the rate of sampling of the optical fibers 16. The pulse magnitude of the electrical outputs represent the energy in the particular part of the spectrum which is incident on a given semiconductor 46. The array of semiconductors 46 thus produce outputs representative of the spectral content of the energy received through the optical fibers 16.

Analysis of the electrical outputs of the semiconductors 46 can readily be performed by a microprocessor or similar microcomputer which is represented by the computer designated at 24 in FIG. 1. The flicker rate information 28 and spectral analysis information represented at 30 in FIG. 1 are essentially a part of the computer 24, the information functions 28 and 30 essentially comprising memories of the computer 24, these memories containing information which defines flicker rate signatures and spectral content signatures for varying types of fires. Given such information in memory, the computer is enabled to compare the spectrum and flicker rate of the received electrical signals from the spectral analyzer 22 with the known fire signatures. The degree of correlation between the electrical signals received from the spectral analyzer 22 with the information 28 and 30 allows the computer 24 to make a decision as to whether the light energy received at the central station 14 through the optical fibers 16 is indicative of a fire.

Referring now to FIG. 4, a preferred embodiment of the computer 24 is shown in association with remaining portions of the present system which interface directly with said computer 24. It is to be understood that elements such as the flicker rate information 28 and spectral analysis information 30 can form a portion of the memory of the computer 24 even though said elements are shown separately therefrom for purposes of illustration. As indicated previously, the spectral analysis information element 30 contains the spectral signatures associated with flames of the various types of combustion which are to be detected. Such information is placed in a memory form and is readily available for various combustible materials of interest such as jet fuel and the like. Similarly, the flicker rate information element 28 reflects information concerning temporal variations in the optical energy from flames of various types of combustion which are of interest, the range of such temporal variations being typically between 20 and 50 Hz. The element 28 essentially involves a determination of whether or not the temporal variations of light intensity on a given channel in question are within this frequency range. The information contained within the elements 28 and 30 can be found from known references such as the following:

(1) Linford, R. M. F., Dillow, C. F., and Trumble, T. M., "Optical Emissions from Burning Jet Fuel," JOURNAL OF AIRCRAFT, Vol. 14, No. 4, May 1977;
(2) Hill, Richard, "Ultraviolet and Near-Infrared Spectral Analysis of a Burner-Can Burn-Through Flame," FAA Report No. FAA-RD-73-154, March 1972;
(3) Custer, L. P. and Bright, R. G., "Fire Detection: State of the Art," June 74, National Bureau of Standards Report No. NASA CR-134842.

The temporal variations referred to above are actually variations in the spectral density magnitude. For flames of interest in the present situation, these variations are known to occur within a frequency range of from 20 to 50 Hz. Within the computer 24, examination of temporal variations can be accomplished in a variety of ways which are within conventional boundaries in the electrical engineering/signal processing art. As will be noted hereinafter, the use of an analog bandpass filter or digital filtering can be used.

In operation, a given channel N has a light signal passed through the optical scanner 20 and the spectrum analyzer 22 as described in detail above, the signal resulting from the spectrum analyzer 22 being fed into the computer 24 and first to correlation 52 which represents a computation of the autocorrelation function between two inputs. The two inputs in the computer 24 are the spectral signature of known flame types which is provided by the spectral analysis information element 30 and the spectral signature of the flame being currently analyzed by the present system. The spectral signature information includes in the system shown a digital representation of spectral energy density versus wave length or frequency. The software 26 necessary for causing the computer 24 to provide the autocorrelation function within the correlation element are well known and are readily available in the art. After the correlation function at 52, the resulting signal is fed to a threshold comparison element at 54 for comparison of the value of the autocorrelation function computed as described above with a predetermined threshold value. Values for predetermined thresholds are made a part of the overall software package as is well known in the art and can be varied depending upon overall system test to provide optimum system performance. Such performance will maximize detection probability and minimize false alarm rate. For purposes of adjusting the threshold comparison element 54, a selectable threshold level adjustment element 56 is provided so that the threshold level can be adjusted.

In the event that the signal from the correlation element 52 is above a given threshold level as determined by the threshold comparison element 54, a signal is fed to the temporal variation examination element 58 for examination of temporal variations in the receive signal. Since claims of interest are known to exhibit a frequency range of from 20 to 50 Hz, the element 58 can conveniently comprise an analog bandpass filter 60 which passes spectral energy from 20 to 50 Hz. The bandpass filter 60 thus allows a signal level above a preset threshold to pass to provide the additional condition for actuating the alarm 34. The particular threshold setting is again determined by actual flame testing. Examination of temporal variations at 58 could also be accomplished by digital filtering with the computer 34 using standard software packages for such comparison.

In the event that the threshold comparison element 54 does not provide sufficient correlation to indicate from spectral analysis that a flame exists, a signal is fed to the spectral information examination element 62 which then commands the system to analyze channel N plus one. Similarly, a signal from the threshold comparison element 54 which is above the predetermined threshold level but which according to the temporal variation examination element 58 does not have a spectral density magnitude within the necessary frequency range results in a signal from the element 58 to the element 62 that "no flicker" has been detected which is of interest and the element 62 again causes the present system to then examine channel N plus one. According to the present system, the alarm 34 is sounded only when the necessary spectral correlation and flicker correlation is present.

It is to be understood that the fire detection system described above can be embodied other than as explicitly described. In particular, the analysis subsystems of the present fire detection system can take a variety of forms without departing from the scope of the invention as particularly defined by the appended claims. Further, the remote monitoring stations of the invention can each be configured with more than one optical collector which may be pointed in differing directions in order to improve the ability of each remote monitoring station to collect light information indicative of fire conditions.

What is claimed is:
1. A fire detection system comprising
   (a) at least one ambient light collecting station;
   (b) means for providing at least one known fire spectral component signature signal;
   (c) means for providing at least one fire flicker rate signature signal;
   (d) means for generating a spectral component signal from said collected ambient light;
   (e) means for generating a flicker rate signal from said collected ambient light;
   (f) means for providing a first fire detection signal by comparing said spectral component signal with at least one spectral component signature signal;
   (g) means for providing a second fire detection signal by comparing said flicker rate signal with said at least one fire flicker rate signature signal; and
   (h) means responsive to said first and second fire detection signals for providing an alarm signal.

2. The apparatus of claim 1 wherein said means for providing an alarm signal provides an alarm signal only when both said first and said second fire detection signals indicate the presence of a fire.

3. The apparatus of claim 1 wherein said spectral component signature signal providing means, said flicker rate signature signal providing means, said spectral component signal generating means, said flicker rate signal generating means, said first and second fire detection signal providing means and said alarm signal providing means comprise:
   (a) a central analysis station remote from said at least one ambient light collecting station; and
   (b) optical transmission means for coupling at least a portion of the ambient light from each said at least once ambient light collecting station to said central analysis station.

4. The apparatus of claim 3 wherein said optical transmission means includes at least one optical fiber.

5. The apparatus of claim 1 wherein said collecting station collects electromagnetic radiation in that portion of the electromagnetic spectrum lying between and including the infrared and the ultraviolet.

6. The apparatus of claim 1 wherein said means for generating a spectral component signal includes
   (a) at least one optical transmission line for coupling collected ambient light from each said at least one collecting station to a remote location;
   (b) optical rotary scanning means aligned at said remote location with said at least one optical transmission line for providing samples of said collected ambient light from each collecting station;
   (c) means for converting said collected ambient light samples into its spectral components; and
   (d) an array of light-sensitive electrical elements receiving said components with each element generating an electrical pulse signal whose amplitude is a function of the energy content of the spectral component illuminating that individual electrical element, said electrical pulse signal comprising said spectral component signal.

7. The apparatus of claim 6 wherein said converting means includes a prism.

8. The apparatus of claim 6 wherein said light-sensitive electrical elements include light-sensitive semiconductors.

9. The apparatus of claim 6 wherein said optical rotary scanning means includes a rotating mirror for sequentially sampling said collected ambient light from each said at least one optical transmission line and coupling said samples to said converting means.

* * * * *